(12) United States Patent
Harrison (10) Patent No.: US 6,881,883 B2
(45) Date of Patent: Apr. 19, 2005

(54) RELATIVE CHORD KEYBOARD INSTRUCTIONAL METHOD

(76) Inventor: Winston Harrison, 235 Adams St., Apt. 11K, Brooklyn, NY (US) 11201

( * ) Notice: Subject to any disclaimer, the term of this patent is extended or adjusted under 35 U.S.C. 154(b) by 95 days.

(21) Appl. No.: 10/626,190

(22) Filed: Jul. 23, 2003

(65) Prior Publication Data

US 2004/0118267 A1 Jun. 24, 2004

Related U.S. Application Data

(60) Provisional application No. 60/398,339, filed on Jul. 25, 2002.

(51) Int. Cl.$^7$ ................................................. G10D 3/00
(52) U.S. Cl. ...................... 84/317; 84/477 R; 84/478; 84/485 R; 84/470 R
(58) Field of Search ...................... 84/317, 477 R, 84/478, 485 R, 470 R (56) References Cited

U.S. PATENT DOCUMENTS

| | | | | |
|---|---|---|---|---|
| 3,208,327 A | * | 9/1965 | Dayton | 84/471 R |
| 3,335,630 A | * | 8/1967 | Schmoyer | 84/478 |
| 3,822,630 A | * | 7/1974 | Leonard | 84/471 R |
| 3,954,040 A | * | 5/1976 | Schmoyer | 84/478 |
| 4,041,828 A | * | 8/1977 | Leonard | 84/471 R |
| 4,198,890 A | * | 4/1980 | Massey et al. | 84/685 |
| 4,203,345 A | * | 5/1980 | Collin et al. | 84/478 |
| 4,480,521 A | * | 11/1984 | Schmoyer | 84/715 |
| 5,685,724 A | * | 11/1997 | Bubar | 434/430 |
| 5,741,990 A | * | 4/1998 | Davies | 84/423 R |
| 5,866,832 A | * | 2/1999 | Solowiow | 84/485 R |
| 6,388,182 B1 | * | 5/2002 | Bermudez | 84/477 R |
| 2002/0050206 A1 | * | 5/2002 | MacCutcheon | 84/477 R |
| 2002/0178896 A1 | * | 12/2002 | George | 84/477 R |

* cited by examiner

Primary Examiner—Shih-yung Hsieh
(74) Attorney, Agent, or Firm—Donald W. Meeker (57) ABSTRACT

A relative chord method for playing a series of chords on a music keyboard by prescribed finger transitions from one chord to the next dependent upon the musical interval between the chords.

15 Claims, 12 Drawing Sheets

| Finger = | +3 | +2 | +1 | 0 | -1 | -2 | -3 |
|---|---|---|---|---|---|---|---|
| Interval = | 7$^{th}$ DN | 5$^{th}$ DN. | 3$^{rd}$ DN. | | 3$^{rd}$ UP | 5$^{th}$ UP | 7$^{th}$ UP |
| Chord = | Dm | F | Am | C | Em | G | Bdim |

Each finger will move to the next diatonic note.

Legend

+ = fingers Up

- = fingers Down n = number of fingers

These are the notes in the key of C major.

Fig. 1

C    Dm    Em    F    G    Am    Bdim

These are the diatonic chords when playing in the key of C major.

Fig. 2

| Finger =   | +3      | +2      | +1      | 0  | -1     | -2     | -3     |
|------------|---------|---------|---------|----|--------|--------|--------|
| Interval = | 7th DN  | 5th DN. | 3rd DN. |    | 3rd UP | 5th UP | 7th UP |
| Chord =    | Dm      | F       | Am      | C  | Em     | G      | Bdim   |

Each finger will move to the next diatonic note.

Legend

+ = fingers Up

− = fingers Down n = number of fingers

Fig. 3

| Finger = | 0 | +3 | -1 | +2 | -2 | +1 | -3 |
|---|---|---|---|---|---|---|---|
| Interval = | | 2nd | 3rd | 4th | 5th | 6th | 7th |
| Chord = | C | Dm | Em | F | G | Am | Bdim. |

Legend

+ = fingers Up

- = fingers Down n = number of fingers

Progression: C, Am, Dm, G

Progression: C, Em, F, G

Progression: C, Em, Am, C

Progression: C, Dm, Em, F

Progression: C, Am, F, G

Progression: C, Emaj, F, Fm

*FIG. 11*

Root pos.

R          3          5

2<sup>nd</sup> pos.

3          5          R 3<sup>rd</sup> pos.

5          R          3

There are three basic shapes for chords: the root position, the second position and the third position.

RELATIVE CHORD KEYBOARD INSTRUCTIONAL METHOD

CLAIM OF PROVISIONAL APPLICATION RIGHTS

This application claims the benefit of U.S. Provisional Patent Application No. 60/398,339, filed on Jul. 25, 2002.

BACKGROUND OF THE INVENTION

1. Field of the Invention

The present invention relates to an instructional method for playing a keyboard musical instrument and in particular to a relative chord method for playing a series of chords on a music keyboard by prescribed finger transitions from one chord to the next dependent upon the musical interval between the chords.

2. Description of the Prior Art

To become a competent musician, it is necessary to learn and remember all musical note relationships, whose interactions together form the rudiments of musical theory. Such note relationships are conventionally taught in an audible manner, with scant visual information to aid understanding. For those students who are naturally musically orientated, such learning may be relatively easy. However, for those students who are not so fortunate, it can prove to be extremely difficult to remember individual note relationships and understand how they are interconnected. Furthermore, while all the note relationships are being learned, it is necessary to learn how these are applied in the playing of a particular musical instrument.

With prior art systems, if you have to play a chord sequence, such as C, F and G, you learn the fingering for all three chords.

U.S. Pat. No. 3,335,630, issued Aug. 15, 1967 to Schmoyer, is for a teaching device for a keyboard instrument, which provides visual indication of the appropriate keys to be depressed in playing a chord in response to depression of a clavial key appropriate to the desired chord. Additional indications designate the note in the chord triad by which chord is identified and the particular finger to be used in playing that note.

U.S. Pat. No. 4,041,828, issued Aug. 16, 1977 to Leonard, indicates a chord fingering coordinator, which is a teaching and practicing aid for music students which graphically displays the relationship of the dominant, tonic, and subdominant scales in a particular key signature and as they relate to the diatonic scale in that key signature. The device structurally comprises a backing sheet that optionally has the scale tones of a diatonic scale named in a row along the bottom, and three preferably reversible panels disposed in staggered horizontal slits cut in the backing sheet. These panels have portions visible above the slit with indicia thereon indicating by fingering number or scale tone name musical notes representing chords or scales. The notes are spaced proportionally to the key spacing of a piano keyboard. There is an optional insert card having two selectively displayable portions, which represent the left and right hand, respectively, with the fingers thereof numbered in accordance with conventional elementary teaching techniques.

U.S. Pat. No. 4,480,521, issued Nov. 6, 1984 to Schmoyer, claims a system and method for instruction in the operation of a keyboard musical instrument, namely, an organ or piano. The system and method teaches the proper fingering for chord triads in the root, first, and second positions so as to play chord triads in the space of a single octave. The system may be operated manually by the student or, in some embodiments thereof, the system may be operated automatically by means of an external storage media device such as a video disc player.

U.S. Patent Application #20020178896, published Dec. 5, 2002 by George, puts forth a method and system of teaching and/or studying music theory and for aiding the practice of musical instruments according to the integration of the color spectrum with notes of the circle of fifths and rearrangement of those notes into the musical chromatic scale. This rearrangement is accomplished by rotating either set of notes (spaced at whole-tone intervals) in the circle of fifths by 180 degrees. The musical chromatic scale arrangement of colors is then applied to various instruments. Diagrams representing the various note/color patterns as they appear on the various color-coded instruments are also provided. Scale and/or chord charts or diagrams for various instruments are also provided. The inventive color code is also applied to tablature, as well as to inventive forms of music notation.

U.S. Patent Application #20020050206, published May 2, 2002 by MacCutcheon, concerns a method facilitating the learning of music by matching coded note symbols of musical compositions to coded note location and formation identifiers of instruments. Colors, that each has a name beginning with one of the letter names of the musical alphabet, are combined with pitch marks, enabling the coding of musical notes. In the preferred embodiment of the invention, the colors are paired with stylized animal images. These animal images' names are coupled with the color names of the invention via reiteration of the first letter of the names to enhance the remembering of the relationship between color and note. The invention's color coding system is also applied to musical composition structures for easy identification of musical elements such as compositional keys and key signature.

U.S. Pat. No. 5,685,724, issued Nov. 11, 1997 to Bubar, provides a method of teaching music and provides the charts to do so. The method includes the steps of teaching the student that "every other finger plays every other key" and showing the student the hand placement on the keyboard that will correspond to a given set of indicia. The method provides a series of charts using indicia that progressively allows the student to play chords with either hand, a melody with the right hand while playing a chord with the left hand, or a multi-key melody with the right hand while playing a chord with the left hand. The method also instructs the student how the sheet music corresponds to the indicia in the charts so that the student can play sheet music.

U.S. Pat. No. 6,388,182, issued May 14, 2002 to Bermudez, shows a music teaching method that utilizes a musical notation sheet to depict a song and a keyboard for playing the song. The notation sheet has a staff that has a single line with numbers printed above and below the line. The numbers correspond to both the fingers of the hands (1–5 from thumb to pinkie) and ten consecutive white keys on a keyboard. Suitable symbols indicate both hands and keyboard. The student is directed to place the hands on the keyboard with the each numbered finger on the same numbered key and to depress that key when its number appears on the music sheet using the fingers of the left hand for the numbers below the staff line and the fingers of the right hand for the numbers above the staff line.

U.S. Pat. No. 4,203,345, issued May 20, 1980 to Collin, describes an automatic visual music teaching device for displaying the structure of coded chords. The device comprises a plurality of actuable switches for selecting a desired coded chord. Signals associated with the actuated switches are temporarily stored and are indicative of the desired coded chord to be visually displayed. A further switch is activated to transfer the stored signals indicative of the desired coded chord to a decoding circuit. The decoded circuit feeds a memory system to select in a matrix the composite parts of the desired coded chord in accordance with a coded data signal sent to it by the decoder whereby the composite parts of the desired coded chord are visually indicated on a visual display element. The method of visually teaching the component part structure of musical coded chords comprises simply the step of selecting switches having coded marking thereon representative of musical notes in major and minor tones and corresponding to a desired coded chord for transferring a corresponding signal to a temporary storage circuit. A transfer switch is then depressed to obtain the visual indication of the composite parts of the desired coded chord for learning purposes.

U.S. Pat. No. 4,198,890, issued Apr. 22, 1980 to Massey, discloses a keyboard system for musical instruments, in which primary digitals of a musical keyboard are actuated in the same fingering sequence for all key signatures. Each primary digital forms part of a three-section group that has two secondary digitals for producing the sharps and flats. Through a separate selector keyboard, the tones produced by selected digitals are shifted by a half-tone in accordance with a logic applied program to transpose operation of the keyboard to the selected key signature.

U.S. Pat. No. 3,822,630, issued Jul. 9, 1974 to Leonard, concerns a music teaching aid based on the hands and scales degrees. The device teaches elementary musical relationships and notation particularly in regard to scale tones and chords uniquely associated with pre-known names and order of the user's fingers on both hands. The same numbering of the fingers, from left to right in each also teaches, by association, the first five degrees by the numerical name. The two hands are on a panel that also supports one of a set of strip inserts carrying, for example, treble and bass clef notation for a particular key signature and the first five, or lower five, notes or tones of that diationic scale. The student will have no difficulty in extrapolating the "mini-scale" of five tones to the full octave and then to octave above or below that are learned by use of the device. For teaching chords a pair of hands are provided with only three fingers on each hand that are denominated as Root, $3^{rd}$ and $5^{th}$ degree and also correlated as before with the fingers named in that same order.

U.S. Pat. No. 3,208,327, issued Sep. 28, 1965 to Allen, illustrates an instant piano picture chord course, which equips the student with chord charts and fingerless gloves, to which lettered tabs may be removably attached. The letters on the tabs correspond to the notes of the various chords on the charts.

What is needed is a system for playing a keyboard with a relative transition technique to get from one chord to the next without having to memorize each chord individually and requiring either leaving a finger in a first chord position or moving the finger only one note to make the transition to the second chord.

SUMMARY OF THE INVENTION

An object of the present invention is to provide any non-classical keyboard style, including a rock style, keyboard learning method that will simplify the way to learn to play a keyboard and simplify the playing process by using a relative transition technique to get from one chord to the next without having to memorize each chord individually, but simply by knowing the transition technique which requires either leaving a finger from a first chord in place or moving the finger one note to get to the next chord.

Another object of the present invention is to provide a universally applied system for making chord transitions that will reduce the time necessary to learn to play the keyboard.

An additional object of the present invention is to allow a keyboard player to use the chord symbols normally used by guitar players to play, without the need to learn to read music.

A further object of the present invention is to use a unique formula to build chords and to change chords thereby greatly simplifying the learning process for playing a keyboard.

One more object of the present invention is to provide a visual representation of the shapes of chords that will also assist the student in forming chords in root and inverted forms.

In brief, the present invention provides a "Relative Chord System". It is only necessary to learn the fingering for the first chord in a song. After that the formula takes over and every subsequent chord is relative to the prior or preceding chord.

The present invention is based on the following principle:

There are seven (7) different notes in each key (1, 2, 3, 4, 5, 6, 7).

It takes three (3) non-adjacent notes to form a chord, e.g. (1, 3, 5).

Therefore after the first chord is formed, any other chord must use an adjacent note to each finger, moving one or more fingers each one note to the right or left or repeating one or more of the current notes by leaving one or two fingers in place on the notes.

The present invention utilizes the relationship that exists between the notes in a chord. To change a chord, each note in the old chord will resolve up to the next note or down to the next note or be repeated. A note will never resolve more than one note away. To change a chord one finger in the chord may be moved up or down a single note, or two fingers may each be moved one note up or down, or all three fingers may be moved one note each holding the same finger position and moving the hand so that all three fingers each move up or down to the next adjacent note. With the one or two finger movements the other fingers or finger remain on the same note as in the previous chord.

The following table shows the musical relationship of moving one two or three fingers from the key of C position on the keyboard with all three fingers starting out from a stationary position (0) on the three notes of the C chord. Each movement of one finger to an adjacent note changes the chord to be up a third by moving the left finger to the left (−1) or down a third by moving the right finger to the right (+1). Moving two adjacent fingers to two adjacent notes changes the chord to be up a fifth by moving the left two fingers each to the adjacent note to the left (−2) or down a fifth by moving the right two fingers each to the adjacent note to the right (+2). Moving all three fingers of a three finger chord to the three adjacent notes changes the chord to be up a seventh by moving all three fingers each one note to the left (−3) or down a seventh by moving all three fingers each one note to the right (+3). This is illustrated in the following table for the C chord with all three fingers being stationary (0) on the three notes of the C chord:

| Finger =   | +2                | +2                | +1                | 0   | −1                | −2                | −3                |
|------------|-------------------|-------------------|-------------------|-----|-------------------|-------------------|-------------------|
| Interval = | 7$^{th}$ DN       | 5$^{th}$ DN.      | 3$^{rd}$ DN.      |     | 3$^{rd}$ UP       | 5$^{th}$ UP       | 7$^{th}$ UP       |
| Chord =    | Dm                | F                 | Am                | C   | Em                | G                 | Bdim              |

For example, to go from C to F, F is a 5$^{th}$ down from C so the right two fingers are each moved to the adjacent note to the right (+2 or two fingers UP) to get to F.

The previous table gives all changes relative to the C chord, but it is the interval that determines the move, not the specific chord. The method applies to all chords and relies on the relationship between the change in intervals and the related finger movements. In C to Em, Em is a 3$^{rd}$ up from C so the formula of the method of the present invention says "−1"(lower one finger). But Em to G is also a 3$^{rd}$ up and would be "−1" (lower one finger).

The rules of the present method are as follows:
If the chord is a 3$^{rd}$ up, "−1" (lower one finger)
If the chord is a 5$^{th}$ up, "−2" (lower two fingers)
If the chord is a 7$^{th}$ up, "−3" (lower three fingers)
If the chord is a 3$^{rd}$ down, "+1" (raise one finger)
If the chord is a 5$^{th}$ down, "+2" (raise two fingers)
If the chord is a 7$^{th}$ down, "+3" (raise three fingers)

The keyboard learning method of the present invention is designed for people who want to learn to play the keyboard but do not have the time to learn the conventional way. It could also be useful to non-keyboard musicians who want to learn basic harmony, lyricists who want to try their hand at composing, or people who already know how to play but do not understand the chord structure used in any non-classical keyboard style, including a rock style. They will be able to play diatonic progressions immediately and then move to more complex progressions.

Figure 3:
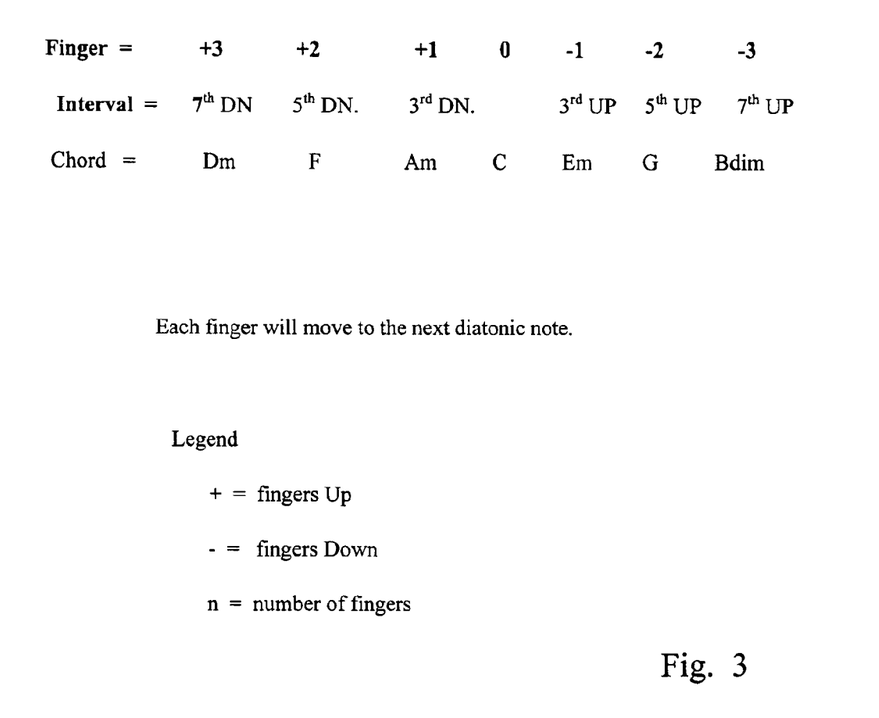
FIG. 3 is a table showing the finger movements to form each of the chords for each interval moving up and down from the C major chord in the middle of the table.
Figure 4:
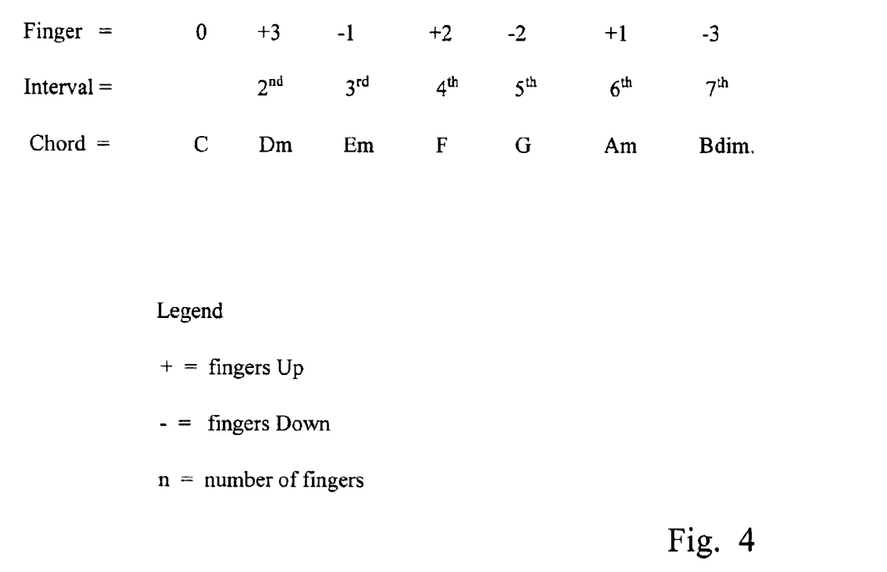
FIG. 4 is a table showing the finger movements to form each of the chords for each interval in the ascending scale beginning at C.

The method of the present invention teaches how to build any chord relative to the chord currently being fingered. In FIGS. 3–4 a unique formula is given for changing from one chord to any other chord based on the musical interval between the two chords.

The method of the present invention may be used for four part harmony with three fingers of one hand moving in a similar way between chords and a finger of the other hand holding the root position. In order to maintain the three-part harmony, chords of four or more notes will be substituted based on the following rules:
For 7$^{th}$ chords, use the triad a 3$^{rd}$ UP
C7=Edim
Cmaj7=Em
Cm7=E flat
Cm7-5=E flat minor.
For 6$^{th}$ chords use the triad a 3$^{rd}$ DOWN
C6=Am
Cm6=Adim.
For 9$^{th}$ chords use the triad a 5$^{th}$ UP
C9=Gm
C7-9=Gdim.
Note: For 9$^{th}$ chords there are other substitutions, depending on the chord you are changing from.

Figure 11:
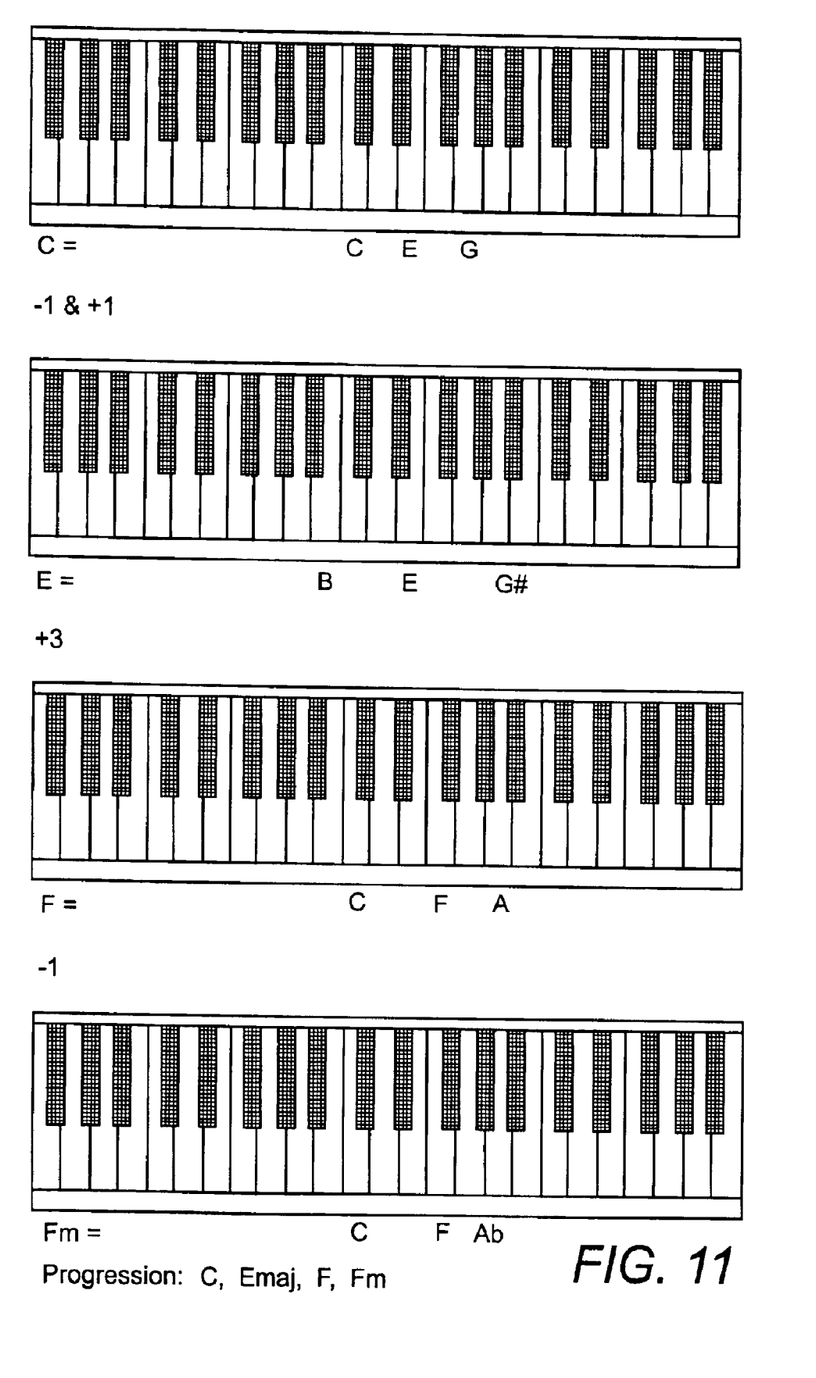
FIG. 11 is a top plan view of a series of keyboards showing the finger positioning for a non-diatonic progression in C major (in non-diatonic progressions the notes often move in opposite directions) going from the chord of C to E to F to Fm.
Figure 12:
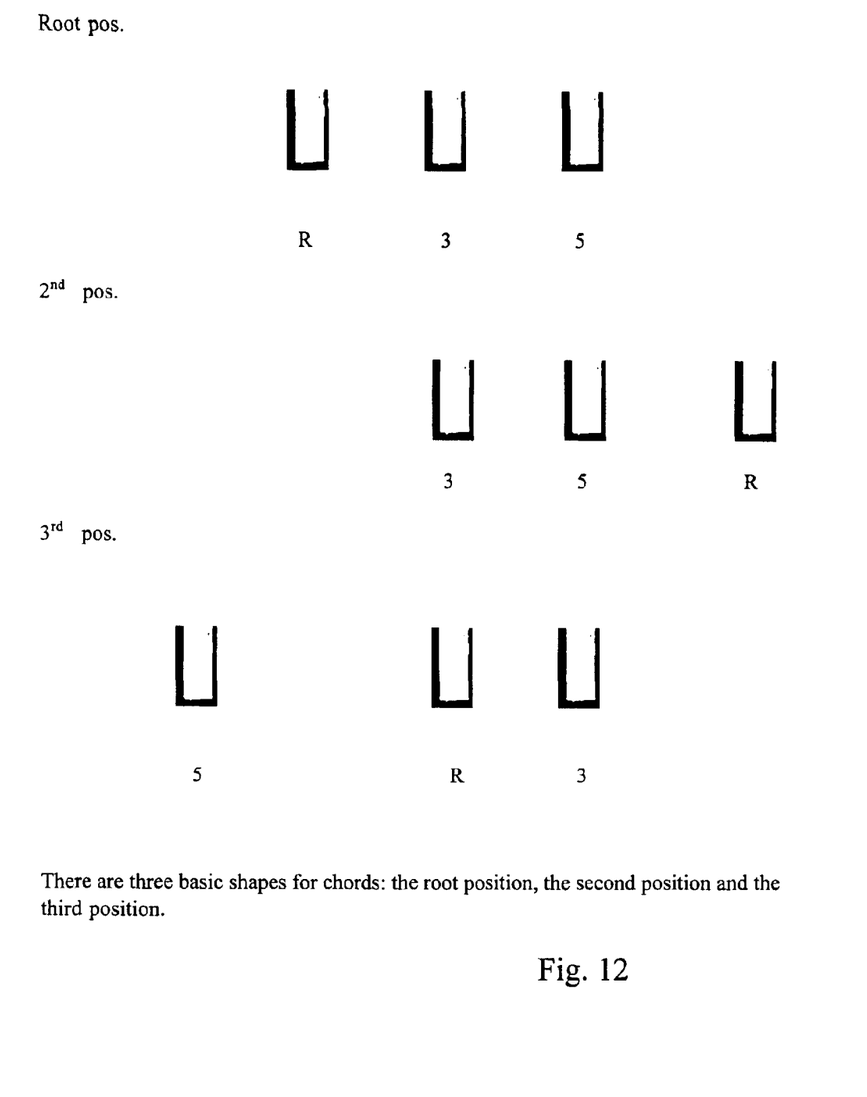
FIG. 12 is a diagrammatic view showing the three basic finger position shapes for chords.

The keyboard learning method of the present invention may be presented in the form of a text, a formula for changing chords (FIGS. 3–4), and some examples of well known chord progressions that are found in many popular songs (FIGS. 5–11), and a chord shape chart (FIG. 12). This material may be in a printed form or electronic form such as on a disc or on the Internet to be learned on a computer screen. This material could also be packaged to ship with new keyboards.

An advantage of the present invention is that it will allow one to play the keyboard without the years of practice normally needed and without the need to sight-read music.

Another advantage of the present invention is that it will help people to learn to play any non-classical keyboard style, including a rock style, keyboard in a short time and without a lot of the music theory that is normally required.

An additional advantage of the present invention is that it will simplify the way that we learn to play the keyboard.

One more advantage of the present invention is that it will also reduce the time necessary to learn to play many of the popular songs that we hear.

Yet another advantage of the present invention is that it allows a person to learn to play the keyboard, prior to the frustration and subsequent abandonment of music lessons.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
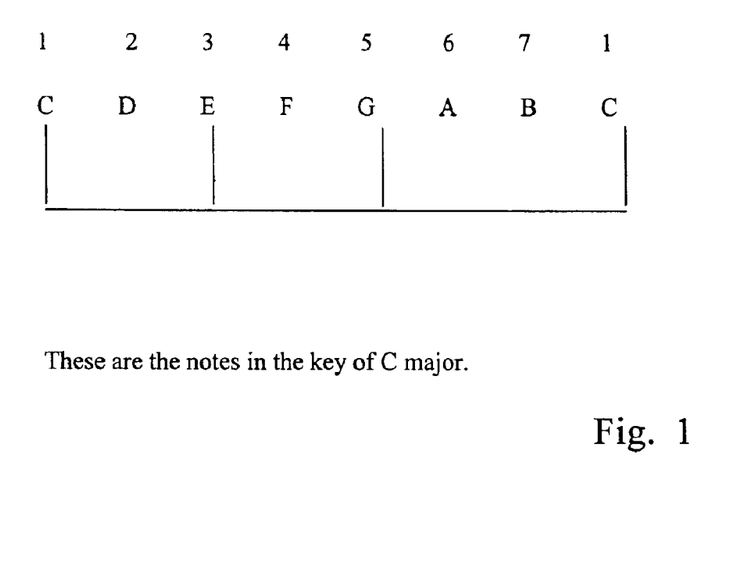
FIG. 1 is a chart illustrating the seven different notes in the C major key (1, 2, 3, 4, 5, 6, 7) with the lines showing the three non-adjacent notes forming the chord of C major (1, 3, 5)

In FIGS. 1–11, a relative chord music keyboard playing method comprises:

positioning a number of fingers on alternate notes on a music keyboard to form a first chord, as in FIG. 1 wherein a first finger is on note #1 for the C note, a second finger is on note #3 for the E note and a third finger is on note #5 for the G note to form the C major chord;

making a finger movement of at least one finger from one of the alternate notes on the music keyboard to an adjacent note away from the other notes having fingers positioned thereon to form a second chord according to a relative transition technique based on the musical interval between the first chord and the second chord so that the musical interval between the first chord and the second chord determines the finger movement according to the formula:

if the second chord has a musical interval a third up from the first chord, the finger movement comprises moving one finger to the left one note (indicated by −1), such as making the transition from the C chord to the Em chord in FIG. 3;

if the second chord has a musical interval a fifth up from the first chord, the finger movement comprises moving two fingers to the left one note each (indicated by −2), such as making the transition from the C chord to the G chord in FIG. 3;

if the second chord has a musical interval a seventh up from the first chord, the finger movement comprises moving three fingers to the left one note each (indicated by −3), such as making the transition from the C chord to the Bdim chord in FIG. 3;

if the second chord has a musical interval a third down from the first chord, the finger movement comprises moving one finger to the right one note (indicated by +1), such as making the transition from the C chord to the Am chord in FIG. 3;

if the second chord has a musical interval a fifth down from the first chord, the finger movement comprises moving two fingers to the right one note each (indicated by +2), such as making the transition from the C chord to the F chord in FIG. 3;

if the second chord has a musical interval a seventh down from the first chord, the finger movement comprises moving three fingers to the right one note each (indicated by +3), such as making the transition from the C chord to the Dm chord in FIG. 3.

Figure 2:
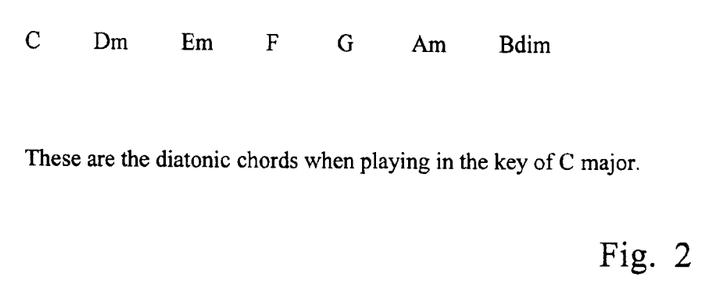
FIG. 2 is a list of all the diatonic chords in the key of C major which will are used in the examples of the present method.

FIG. 2 lists of all the diatonic chords in the key of C major which will are used in the examples of the present method including C, Dm, Em, F, G, Am and Bdim.

FIG. 3 is a table showing the finger movements to form each of the chords for each interval moving up and down from the C major chord in the middle of the table with the fingers in the initial stationary position (indicated by 0) of the chord of C and showing the chord transitions to the right and left by a $3^{rd}$, $5^{th}$, and $7^{th}$ musical interval either up or down and the corresponding finger movements including:

−1 and +1 for one finger moved one adjacent note to the left or right in making the relative chord transition according to the musical interval between chords up a $3^{rd}$ and down a $3^{rd}$ respectively;

−2 and +2 for two fingers moved one adjacent note each to the left or right in making the relative chord transition according to the musical interval between chords up a $5^{th}$ and down a $5^{th}$ respectively;

−3 and +3 for three fingers moved one adjacent note each to the left or right in making the relative chord transition according to the musical interval between chords up a $7^{th}$ and down a $7^{th}$ respectively.

FIG. 4 is a table showing the finger movements to form each of the chords for each interval in the ascending scale of the diatonic chords of FIGS. 2 and 3, beginning at C and moving through Dm, Em, F, G, Am, and Bdim.

Figure 5:
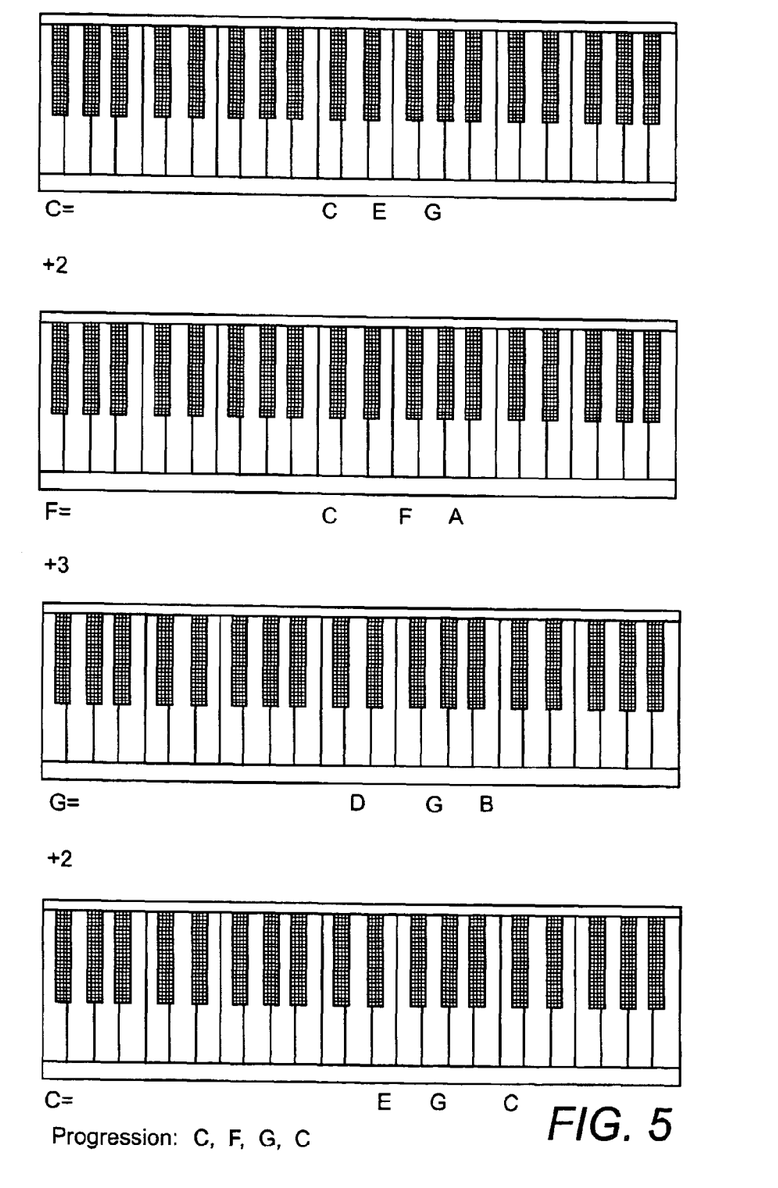
FIG. 5 is a top plan view of a series of keyboards showing the finger positioning for a popular diatonic progression in C major (in diatonic progressions the notes always move in the same direction) going from the chord of C to F to G to C.

In FIG. 5, a series of keyboards show the finger positioning for a popular diatonic progression in C major (in diatonic progressions the notes always move in the same direction) going from the chord of C to F and G and C. In the top keyboard the C chord has the fingers on the C, E, and G notes. In the second keyboard, to make the transition to the F chord which is down a fifth from the C chord, the two right fingers each move up one note (+2) so that the fingers for the F chord are now on the C, F, and A notes. In the third keyboard, to make the transition to the G chord, which is down a seventh from the F chord, all three fingers are each moved one note to the right (+3) so that the fingers for the G chord are now on the D, G, and B notes. In the fourth keyboard to make the transition to the high C chord which is down a fifth from the G chord, the left and right fingers are each moved up one note (+2) so that the fingers for the C chord are now on the E, G, and C notes.

Figure 6:
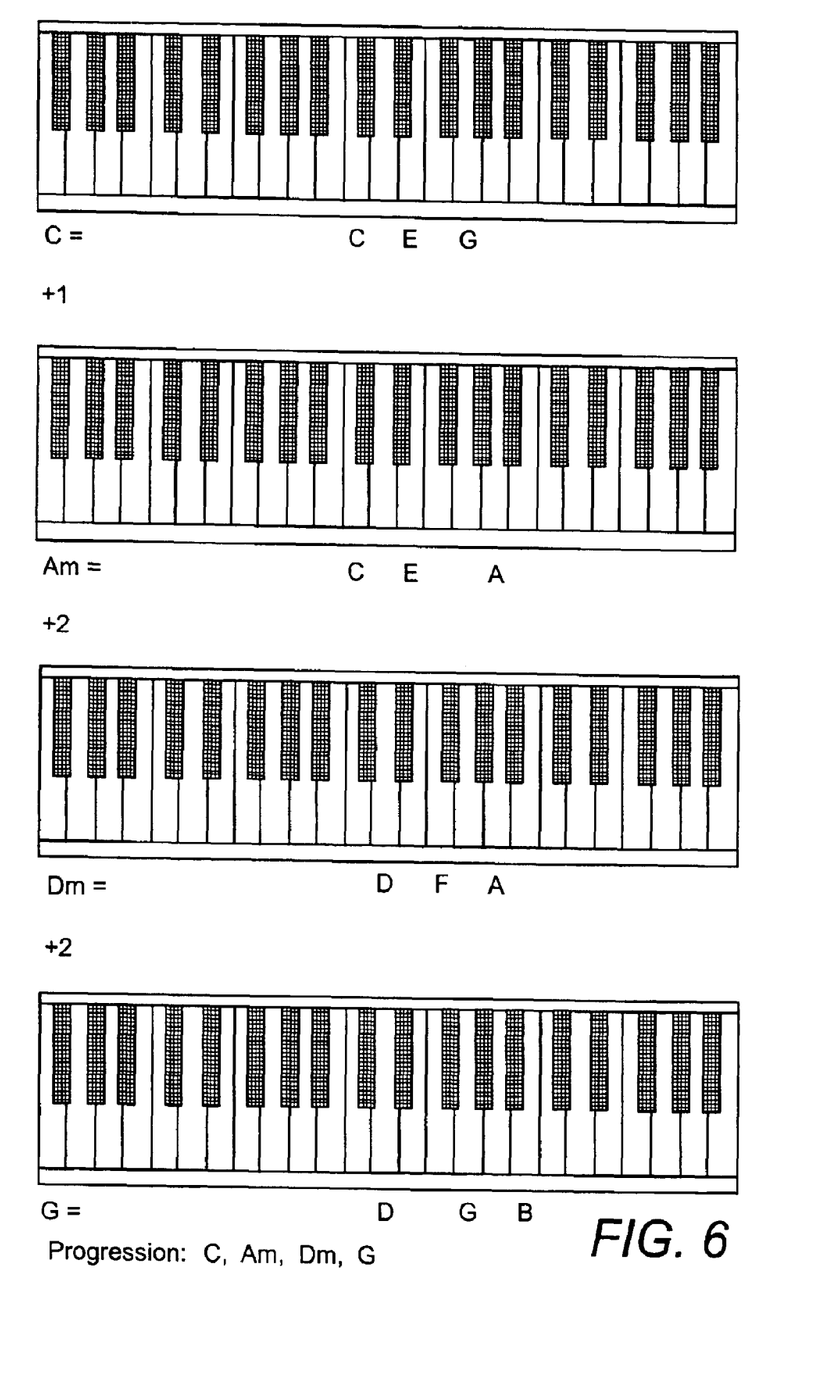
FIG. 6 is a top plan view of a series of keyboards showing the finger positioning for another popular diatonic progression in C major (in diatonic progressions the notes always move in the same direction) going from the chord of C to Am to Dm to G.

In FIG. 6, a series of keyboards show the finger positioning for a popular diatonic progression in C major going from the chord of C to Am and Dm and G. In the top keyboard the C chord has the fingers on the C, E, and G notes. In the second keyboard, to make the transition to the Am chord which is down a third from the C chord, the right finger moves up one note (+1) so that the fingers for the Am chord are now on the C, E, and A notes. In the third keyboard, to make the transition to the Dm chord which is down a fifth from the Am chord, the two left fingers are each moved one note to the right (+2) so that the fingers for the Dm chord are now on the D, F, and A notes. In the fourth keyboard to make the transition to the G chord, which is down a fifth from the Dm chord, the two right fingers are each moved up one note (+2) so that the fingers for the G chord are now on the D, G, and B notes.

Figure 7:
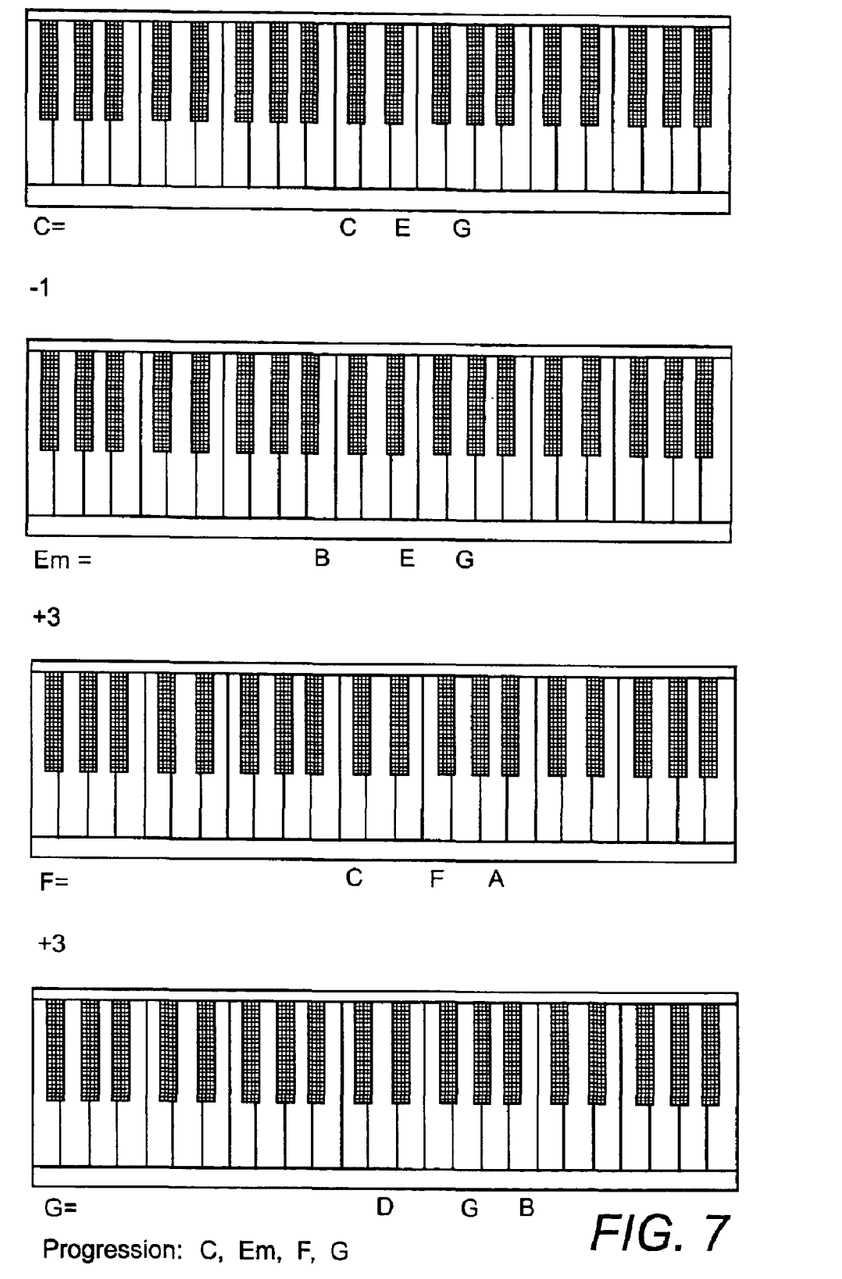
FIG. 7 is a top plan view of a series of keyboards showing the finger positioning for another popular diatonic progression in C major (in diatonic progressions the notes always move in the same direction) going from the chord of C to Em to F to G.

In FIG. 7, a series of keyboards show the finger positioning for a popular diatonic progression in C major going from the chord of C to Em and F and G. In the top keyboard the C chord has the fingers on the C, E, and G notes. In the second keyboard, to make the transition to the Em chord which is up a third from the C chord, the left finger moves down one note (−1) so that the fingers for the Em chord are now on the B, E, and G notes. In the third keyboard, to make the transition to the F chord, which is down a seventh from the Em chord, all three fingers are each moved one note to the right (+3) so that the fingers for the F chord are now on the C, F, and A notes. In the fourth keyboard to make the transition to the G chord, which is down a seventh from the F chord, all three fingers are each moved up one note (+3) so that the fingers for the G chord are now on the D, G, and B notes.

Figure 8:
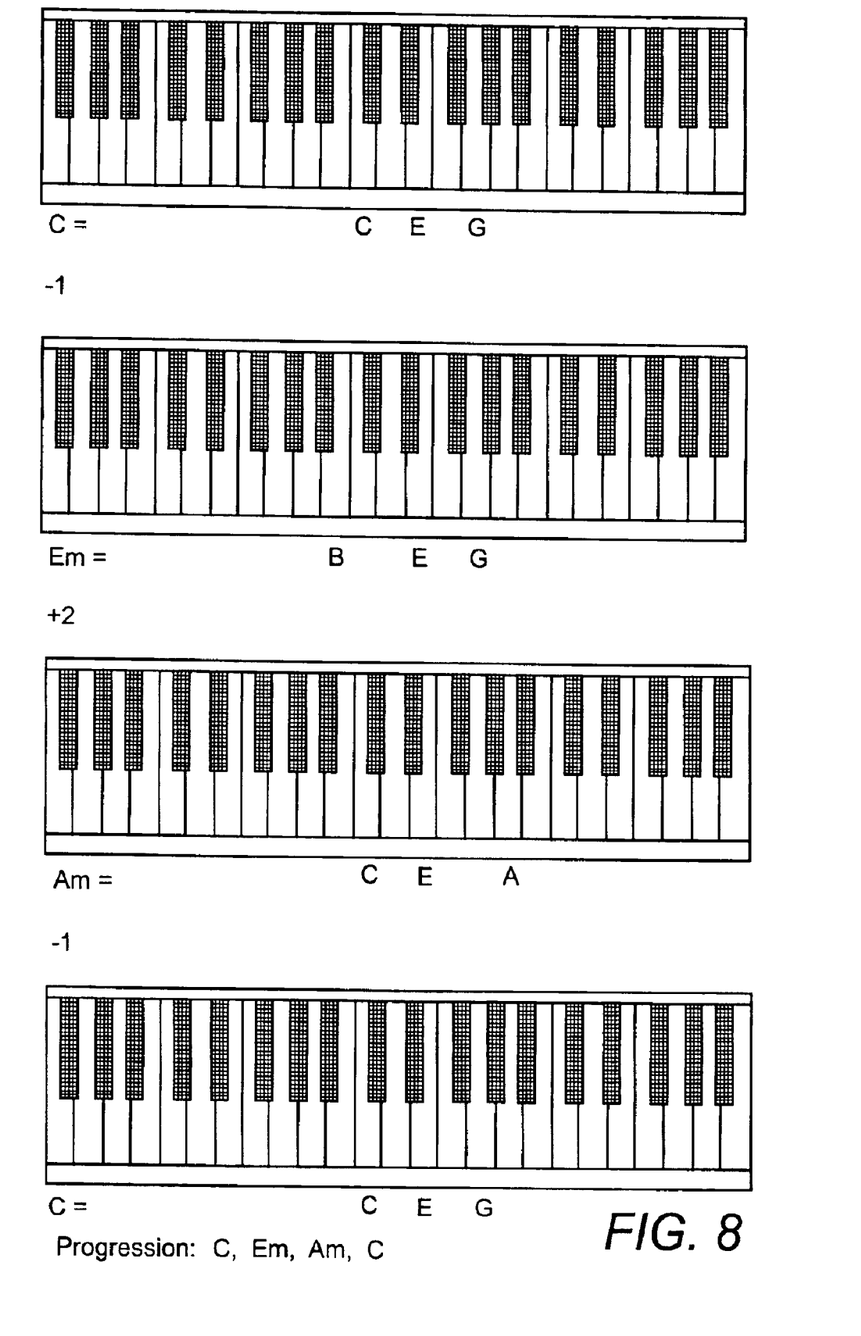
FIG. 8 is a top plan view of a series of keyboards showing the finger positioning for another popular diatonic progression in C major (in diatonic progressions the notes always move in the same direction) going from the chord of C to Em to Am to C.

In FIG. 8, a series of keyboards show the finger positioning for a popular diatonic progression in C major going from the chord of C to Em and Am and C. In the top keyboard the C chord has the fingers on the C, E, and G notes. In the second keyboard, to make the transition to the Em chord which is up a third from the C chord, the left finger moves down one note (−1) so that the fingers for the Em chord are now on the B, E, and G notes. In the third keyboard, to make the transition to the Am chord which is down a fifth from the Em chord, the left and right fingers are each moved one note to the right (+2) so that the fingers for the Am chord are now on the C, E, and A notes. In the fourth keyboard to make the transition to the C chord which is up a third from the Am chord, the right finger is moved down one note (−1) so that the fingers for the C chord are now on the C, E, and G notes.

Figure 9:
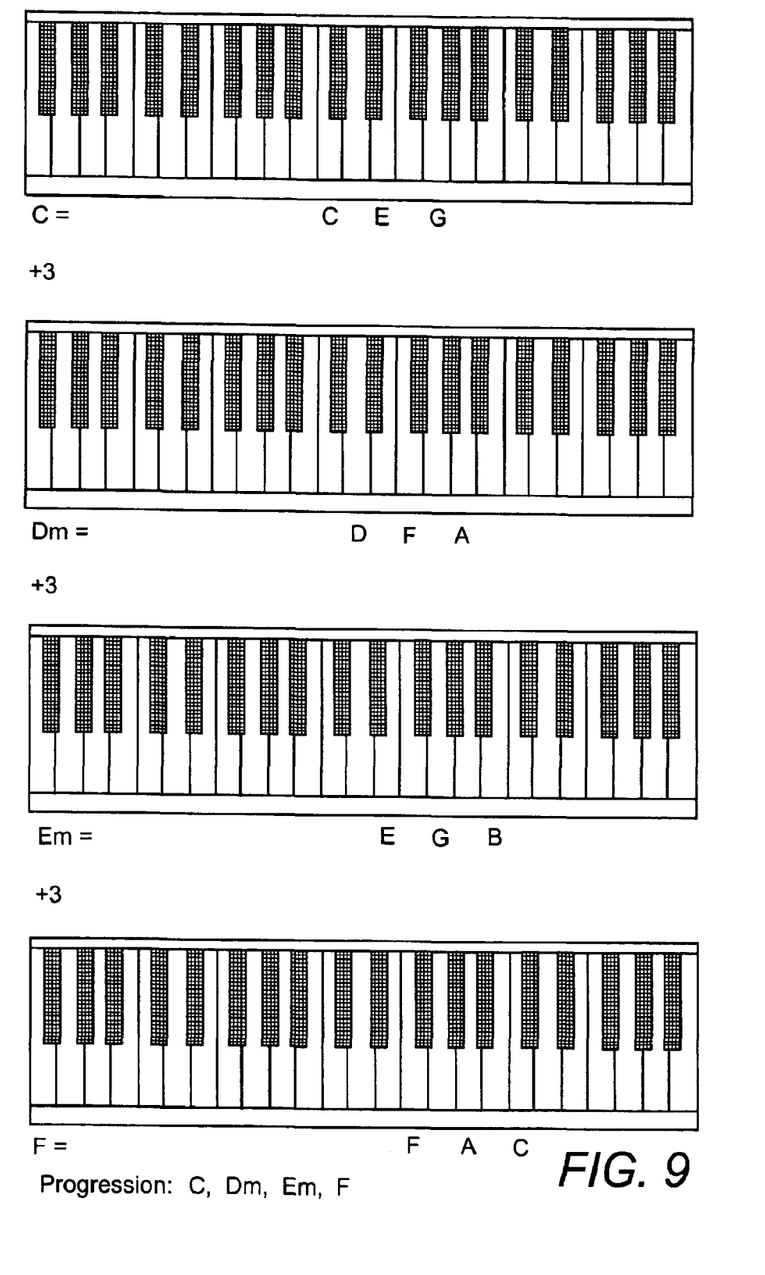
FIG. 9 is a top plan view of a series of keyboards showing the finger positioning for another popular diatonic progression in C major (in diatonic progressions the notes always move in the same direction) going from the chord of C to Dm to Em to F.

In FIG. 9, a series of keyboards show the finger positioning for a popular diatonic progression in C major going from the chord of C to Dm and Em and F. In the top keyboard the C chord has the fingers on the C, E, and G notes. In the second keyboard, to make the transition to the Dm chord which is down a seventh from the C chord, all three fingers each move up one note (+3) so that the fingers for the Dm chord are now on the D, F, and A notes. In the third keyboard, to make the transition to the Em chord, which is down a seventh from the Dm chord, all three fingers are each moved one note to the right (+3) so that the fingers for the Em chord are now on the E, G, and B notes. In the fourth keyboard to make the transition to the F chord which is down a seventh from the Em chord, all three fingers are each moved up one note (+3) so that the fingers for the F chord are now on the F, A, and C notes.

Figure 10:
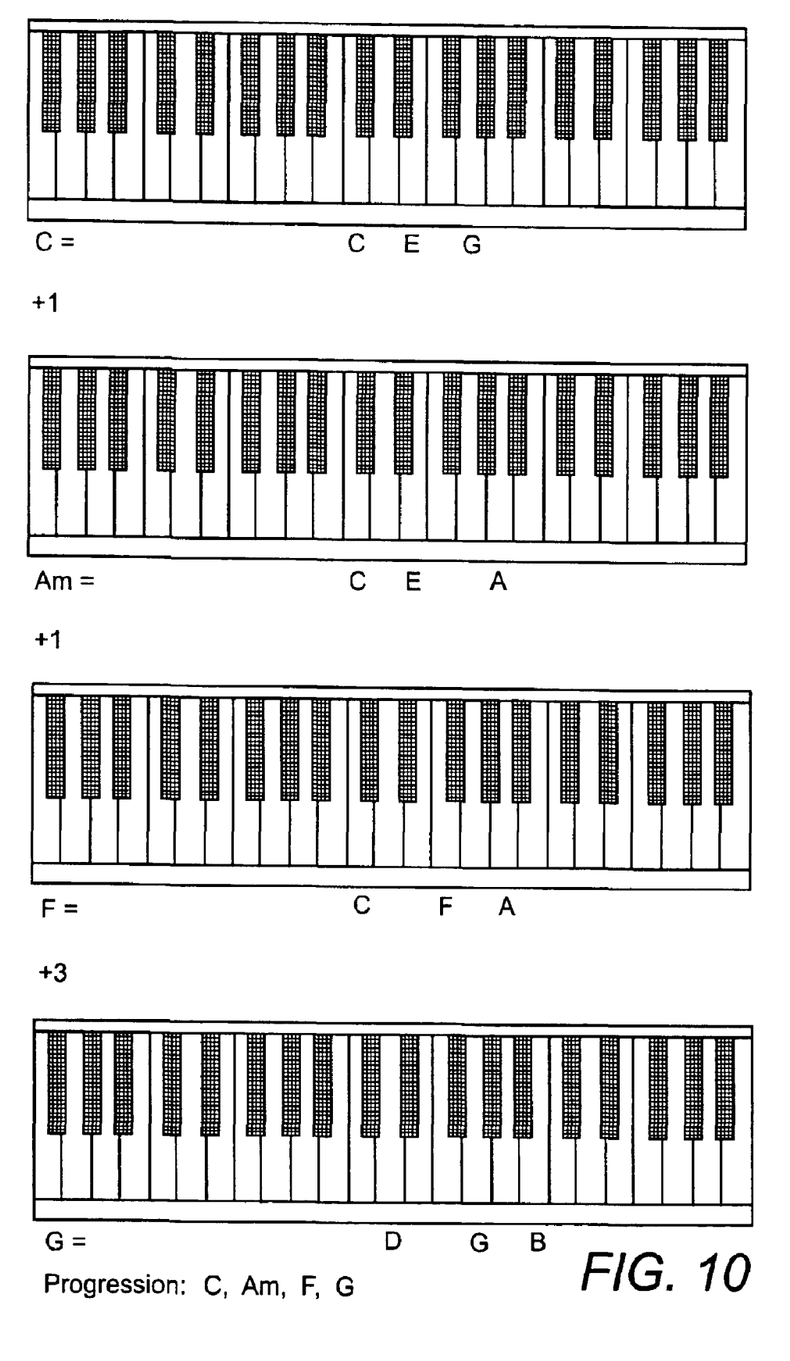
FIG. 10 is a top plan view of a series of keyboards showing the finger positioning for another popular diatonic progression in C major (in diatonic progressions the notes always move in the same direction) going from the chord of C to Am to F to G.

In FIG. 10, a series of keyboards show the finger positioning for a popular diatonic progression in C major going from the chord of C to Am and F and G. In the top keyboard the C chord has the fingers on the C, E, and G notes. In the second keyboard, to make the transition to the Am chord which is down a third from the C chord, the right finger moves up one note (+1) so that the fingers for the Am chord now on the C, E, and A notes. In the third keyboard, to make the transition to the F chord which is down a third from the Am chord, the middle finger is moved one note to the right (+1) so that the fingers for the F chord are now on the C, F, and A notes. In the fourth keyboard to make the transition to the G chord, which is down a seventh from the F chord, all three fingers are each moved up one note (+3) so that the fingers for the G chord are now on the D, G, and B notes.

In FIG. 11, a series of keyboards show the finger positioning for a popular non-diatonic progression in C major (wherein the notes may move in different directions to make the transition from one chord to the next) going from the chord of C to E and F and Fm. In the top keyboard the C chord has the fingers on the C, E, and G notes. In the second keyboard, to make the transition to the E chord, which is up and down a third respectively from the C chord, the left finger moves down one note (−1) and the right finger moves up one note (+1) so that the fingers for the E chord are now on the B, E, and G# notes. In the third keyboard, to make the transition to the F chord, which is down a seventh from the E chord, all three fingers are each moved one note to the right (+3) so that the fingers for the F chord are now on the C, F, and A notes. In the fourth keyboard to make the transition to the Fm chord, which is up a third from the F chord, the right finger is moved down one note (−1) so that the fingers for the Fm chord are now on the C, F, and Ab notes.

In FIG. 12, a diagrammatic view shows the three basic finger position shapes for chords.

The method of the present invention may be used for four part harmony with three fingers of one hand moving in a similar way between chords and a finger of the other hand holding the root position. In order to maintain the three-part harmony, chords of four or more notes will be substituted based on the following rules:

For $7^{th}$ chords, use the triad a $3^{rd}$ UP
C7=Edim
Cmaj7=Em
Cm7=E flat
Cm7-5=E flat minor.
For $6^{th}$ chords use the triad a $3^{rd}$ DOWN
C6=Am
Cm6=Adim.
For $9^{th}$ chords use the triad a $5^{th}$ UP
C9=Gm
C7-9=Gdim.
Note: For $9^{th}$ chords there are other substitutions, depending on the chord you are changing from.

The music instruction method can be printed in a book form or stored in an electronic form and utilized in conjunction with a computer and transmitted via the Internet.

For distribution purposes the music instruction method may be presented in a book or electronic medium provided with a music keyboard.

It is understood that the preceding description is given merely by way of illustration and not in limitation of the invention and that various modifications may be made thereto without departing from the spirit of the invention as claimed.

What is claimed is:

1. A relative chord music keyboard playing method comprising:
   positioning a number of fingers on alternate notes on a music keyboard to form a first chord;
   making a finger movement of at least one finger from one of the alternate notes on the music keyboard to an adjacent note away from the other notes having fingers positioned thereon to form a second chord according to a relative transition technique based on the musical interval between the first chord and the second chord so that the musical interval between the first chord and the second chord determines the finger movement according to a formula:
   the second chord has a musical interval a third up from the first chord, the finger movement comprises moving one finger to the left one note;
   the second chord has a musical interval a fifth up from the first chord, the finger movement comprises moving two fingers to the left one note each;
   the second chord has a musical interval a seventh up from the first chord, the finger movement comprises moving three fingers to the left one note each;
   the second chord has a musical interval a third down from the first chord, the finger movement comprises moving one finger to the right one note;
   the second chord has a musical interval a fifth down from the first chord, the finger movement comprises moving two fingers to the right one note each;
   the second chord has a musical interval a seventh down from the first chord, the finger movement comprises moving three fingers to the right one note each.

2. The method of claim 1 comprising a music instruction method employing annotations for the finger movements indicated in proximity to the respective musical interval indications for each of a series of second chords relative to a previous chord, the first chord.

3. The method of claim 2 wherein the annotation for the movement of one finger from one note to an adjacent note to the left comprises the symbol −1 for a musical interval of a third up.

4. The method of claim 2 wherein the annotation for the movement of two fingers each from one note to an adjacent note to the left comprises the symbol −2 for a musical interval of a fifth up.

5. The method of claim 2 wherein the annotation for the movement of three fingers each from one note to an adjacent note to the left comprises the symbol −3 for a musical interval of a seventh up.

6. The method of claim 2 wherein the annotation for the movement of one finger from one note to an adjacent note to the right comprises the symbol +1 for a musical interval of a third down.

7. The method of claim 2 wherein the annotation for the movement of two fingers each from one note to an adjacent note to the right comprises the symbol +2 for a musical interval of a fifth down.

8. The method of claim 2 wherein the annotation for the movement of three fingers each from one note to an adjacent note to the right comprises the symbol +3 for a musical interval of a seventh down.

9. The method of claim 2 wherein the music instruction method further comprises instructions, a formula for changing chords, examples of well known chord progressions that are found in many popular songs, and a chord shape chart all employing the annotations for the finger movements indicated in proximity to the respective musical interval indications for each of a series of second chords relative to a previous-chord.

10. The method of claim 9 wherein the music instruction method is printed in a book form.

11. The method of claim 9 wherein the music instruction method is stored in an electronic form.

12. The method of claim 11 wherein the music instruction method is capable of be ing utilized in conjunction with a computer.

13. The method of claim 11 wherein the music instruction method is capable of being transmitted via the Internet.

14. The method of claim 2 wherein the music instruction method is capable of being presented in a medium provided with a music keyboard.

15. The method of claim 2 wherein the method is used for four part harmony with three fingers of one hand employing the relative movement from one chord to the next and a finger of the other hand holding the root position.

* * * * *